(12) United States Patent
Dozen

(10) Patent No.: US 10,331,403 B2
(45) Date of Patent: Jun. 25, 2019

(54) AUDIO INPUT SYSTEM, AUDIO INPUT APPARATUS, AND RECORDING MEDIUM THEREFOR

(71) Applicant: Kyocera Document Solutions Inc., Osaka (JP)

(72) Inventor: Kazuki Dozen, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/908,809

(22) Filed: Feb. 28, 2018

(65) Prior Publication Data

US 2018/0285066 A1 Oct. 4, 2018

(30) Foreign Application Priority Data

Mar. 29, 2017 (JP) .................................. 2017-064874

(51) Int. Cl.
*G06F 3/16* (2006.01)
*H04N 1/00* (2006.01)
*G10L 25/78* (2013.01)

(52) U.S. Cl.
CPC .............. *G06F 3/167* (2013.01); *G10L 25/78* (2013.01); *H04N 1/00403* (2013.01); *H04N 1/00925* (2013.01); *G10L 2025/783* (2013.01)

(58) Field of Classification Search
CPC ... G06F 3/167; G10L 25/78; G10L 2025/783; H04N 1/00403; H04N 1/00925
See application file for complete search history.

(56) References Cited

U.S. PATENT DOCUMENTS

| 5,983,186 A * | 11/1999 | Miyazawa | G10L 15/26 704/233 |
| 6,397,186 B1 * | 5/2002 | Bush | G06F 3/167 704/274 |
| 2014/0222436 A1 * | 8/2014 | Binder | G06F 3/167 704/275 |
| 2015/0134341 A1 * | 5/2015 | Tamura | G06F 3/04842 704/275 |
| 2017/0034430 A1 * | 2/2017 | Fu | G06F 3/167 |
| 2018/0275951 A1 * | 9/2018 | Kagoshima | G06F 3/165 |

FOREIGN PATENT DOCUMENTS

JP 2016-200782 A 12/2016

* cited by examiner

*Primary Examiner* — David L Ton
(74) *Attorney, Agent, or Firm* — HEA Law PLLC

(57) ABSTRACT

An audio input system includes an audio input apparatus and a plurality of electronic devices. The audio input apparatus includes an audio input unit, a start instruction accepting unit, and an instruction transmitter. The plurality of electronic devices includes a first electronic device. The first electronic device is a target of a process execution instruction based on the audio input by the audio input unit among the instructions. The instruction transmitter transmits a process reducing instruction for reducing an execution of a process as the instruction to the plurality of electronic devices, when an input sound volume of a microphone exceeds a specific sound volume. The audio input unit starts the audio input when the input sound volume of the microphone is equal to or less than the specific sound volume. The instruction transmitter transmits the process execution instruction to the first electronic device.

13 Claims, 12 Drawing Sheets

26b

| Equipment ID | IP Address | · · · |
|---|---|---|
| A | ○○.○○.○○.○○ | · · · |
| B | △△.△△.△△.△△ | · · · |
| . | . | . |
| . | . | . |
| . | . | . |

| Equipment ID | Process Name | Input Sound Volume |
|---|---|---|
| A | a | 80 dB |
| A | b | 75 dB |
| . | . | . |
| . | . | . |
| . | . | . |
| B | a | 70 dB |
| B | c | 85 dB |
| . | . | . |
| . | . | . |
| . | . | . |

| Equipment ID | Process Name | Input Sound Volume |
|---|---|---|
| A | c | 4 0 d B |
| A | d | 4 5 d B |
| . | . | . |
| . | . | . |
| . | . | . |
| B | b | 3 5 d B |
| B | d | 3 0 d B |
| . | . | . |
| . | . | . |
| . | . | . |

| Equipment ID | Process Name | Input Sound Volume |
|---|---|---|
| A | a | 8 0 d B |
| A | b | 7 5 d B |
| . | . | . |
| . | . | . |
| . | . | . |
| B | a | 7 0 d B |
| B | b | 8 0 d B |
| B | c | 8 5 d B |
| . | . | . |
| . | . | . |
| . | . | . |

AUDIO INPUT SYSTEM, AUDIO INPUT APPARATUS, AND RECORDING MEDIUM THEREFOR

INCORPORATION BY REFERENCE

This application is based upon, and claims the benefit of priority from, corresponding Japanese Patent Application No. 2017-064874 filed in the Japan Patent Office on Mar. 29, 2017, the entire contents of which are incorporated herein by reference.

BACKGROUND

Unless otherwise indicated herein, the description in this section is not prior art to the claims in this application and is not admitted to be prior art by inclusion in this section.

As a typical audio input system, there has been known an audio input system that includes an audio input apparatus including a microphone, and an electronic device that executes an operation that generates sound (hereinafter referred to as a "sound generating operation"). In this audio input system, after a start instruction for an audio-input via the microphone is accepted, when it is determined that there is no urgency for the sound generating operation based on at least one of a sensing result of a sensor included in the electronic device and a control state of the electronic device, the execution of the sound generating operation is reduced.

SUMMARY

An audio input system according to one aspect of the disclosure includes an audio input apparatus and a plurality of electronic devices. The audio input apparatus includes a microphone. The audio input apparatus includes an audio input unit, a start instruction accepting unit, and an instruction transmitter. The audio input unit receives audio via the microphone. The start instruction accepting unit accepts a start instruction for an audio-input by the audio input unit. The instruction transmitter transmits an instruction to the plurality of electronic devices. The plurality of electronic devices includes a first electronic device and one or more second electronic devices. The first electronic device is a target of a process execution instruction based on the audio input by the audio input unit among the instructions. The one or more second electronic devices are other than the target of the audio input instruction. The instruction transmitter transmits a process reducing instruction for reducing an execution of a process as the instruction to the plurality of electronic devices, when an input sound volume of the microphone exceeds a specific sound volume after the reception of the start instruction by the start instruction accepting unit. The audio input unit starts the audio input when the input sound volume of the microphone is equal to or less than the specific sound volume after the reception of the start instruction by the start instruction accepting unit. The instruction transmitter transmits the process execution instruction to the first electronic device. The first electronic device accepts the process execution instruction transmitted from the instruction transmitter.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4 illustrates an exemplary noise-cause process table illustrated in FIG. 2.

FIG. 5 illustrates an exemplary small-sound-volume process table illustrated in FIG. 2.

FIG. 11 illustrates one example different from the example illustrated in FIG. 4 of the noise-cause process table illustrated in FIG. 2.

DETAILED DESCRIPTION

Figure 1:
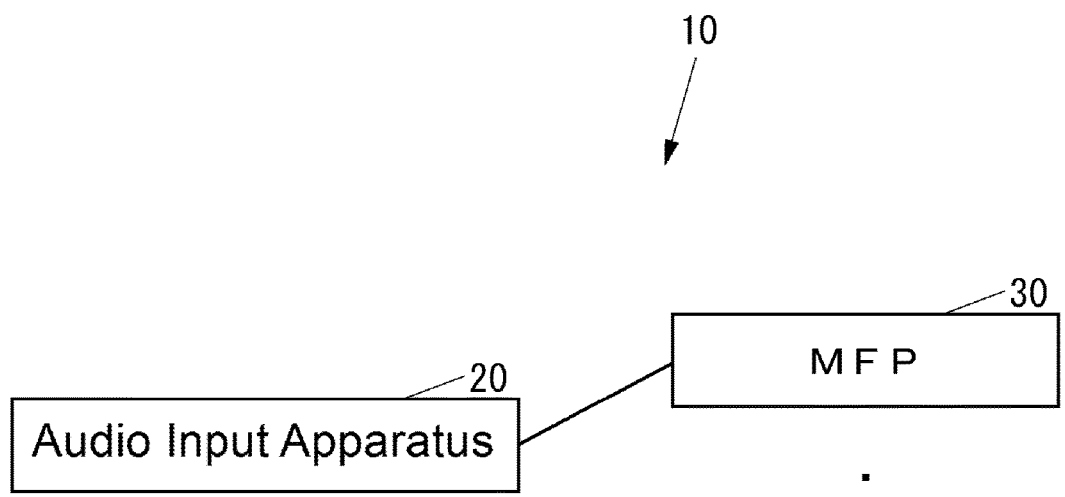
FIG. 1 illustrates a block diagram of an audio input system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with reference to drawings.

First, a configuration of an audio input system according to one embodiment of the disclosure will be described.

FIG. 1 illustrates a block diagram of an audio input system 10 according to the embodiment.

As illustrated in FIG. 1, the audio input system 10 includes an audio input apparatus 20, and a multifunction peripheral (MFP) 30 as an electronic device.

The audio input system 10 is configured to include at least one MFP, which is similar to the MFP 30, other than the MFP 30. The MFP 30 is also referred to as a first electronic device. The MFP other than the MFP 30 is also referred to as a second electronic device.

The audio input apparatus 20 can be connected to the MFP 30 to operate the MFP 30 by audio input. In the embodiment, it is assumed that the MFP 30 is an instruction target based on the audio input from the audio input apparatus 20, and the MFP (hereinafter referred to as an "other MFP") other than the MFP 30 is not the instruction target of the audio input. The audio input system 10 may include a plurality of other MFPs.

Figure 2:
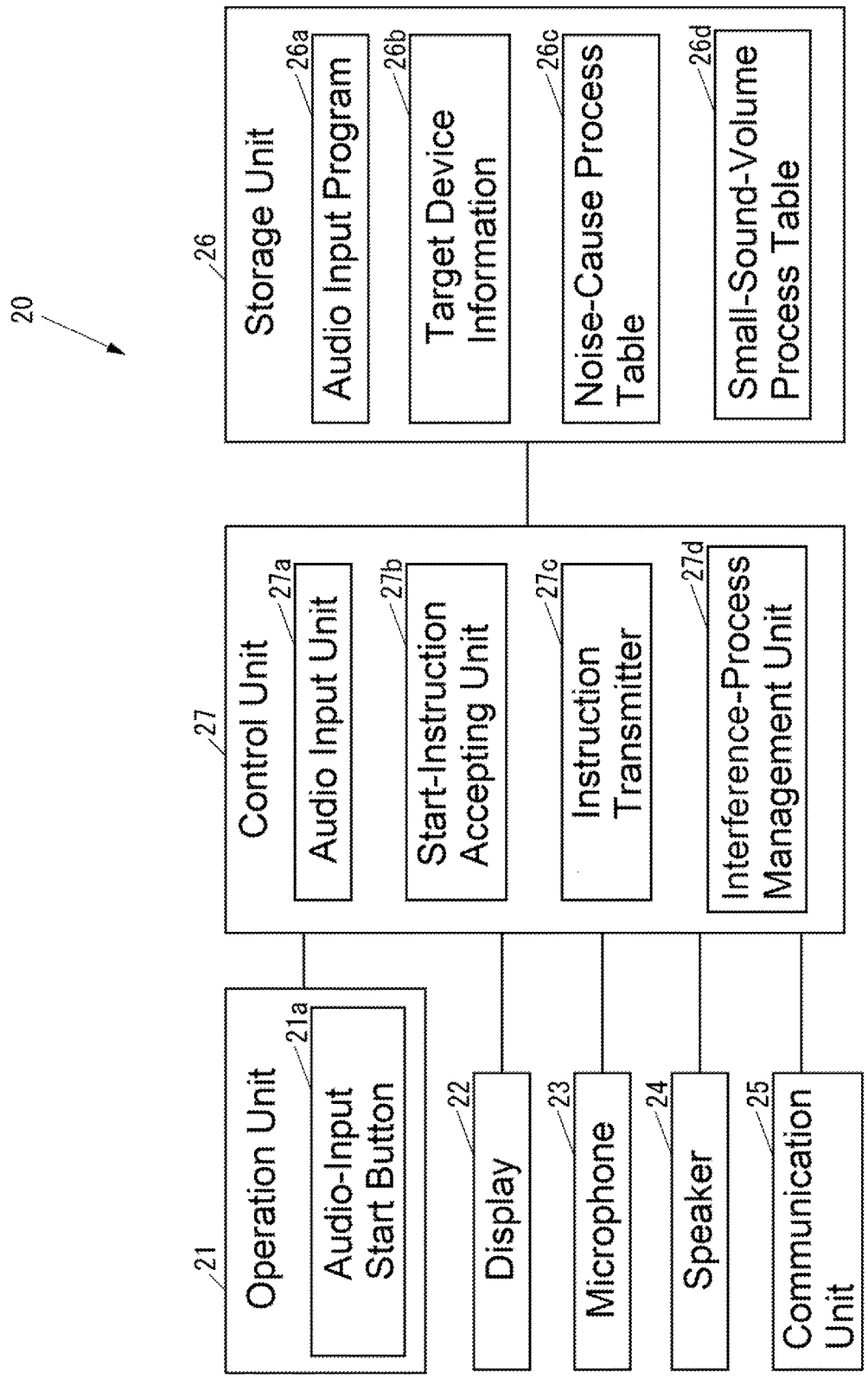
FIG. 2 illustrates a block diagram of an audio input apparatus according to the one embodiment.

FIG. 2 illustrates a block diagram of the audio input apparatus 20.

As illustrated in FIG. 2, the audio input apparatus 20 includes an operation unit 21, a display 22, a microphone 23, a speaker 24, a communication unit 25, a storage unit 26, and a control unit 27. The operation unit 21 is an input device such as a button to which various operations are input. The display 22 is a display device such as a liquid crystal display (LCD) that displays various information. The communication unit 25 is a communication device that communicates with an external device via a network, or directly by wire or without wire without using the network. The storage unit 26 is a non-volatile storage device such as a semiconductor memory or a hard disk drive (HDD) that stores various information. The control unit 27 controls whole of the audio input apparatus 20. The audio input apparatus 20 may be constituted of, for example, a computer such as a smart phone or a tablet.

The communication unit 25 can be connected to the MFP 30 by short range wireless communication in a peer-to-peer system (for example, Bluetooth™ and Wi-Fi™ direct). The short range wireless communication is also referred to as a first wireless communication. The communication unit 25 can be connected to the MFP 30 and the MFP other than the MFP 30 by wireless communication (for example, wireless LAN (wireless local area network)) via the network. This wireless communication is also referred to as a second wireless communication. In view of this, the audio input apparatus 20 can operate the MFP 30 by the audio input when the audio input apparatus 20 has a positional relationship with the MFP 30 to perform the short range wireless communication in the peer-to-peer system.

In the operation unit 21, an audio-input start button 21a for accepting a start instruction for the audio-input is included.

The storage unit 26 stores an audio input program 26a for receiving the audio via the microphone 23. The audio input program 26a may be installed on the audio input apparatus 20 at production stage of the audio input apparatus 20, may be additionally installed on the audio input apparatus 20 from an outside storage medium such as a Universal Serial Bus (USB) memory, or may be additionally installed on the audio input apparatus 20 via the network.

The storage unit 26 is configured to store target device information 26b that shows an MFP for process target of the audio input apparatus 20.

Figure 3:
FIG. 3 illustrates exemplary target device information illustrated in FIG. 2.

FIG. 3 illustrates exemplary target device information 26b.

As illustrated in FIG. 3, in the target device information 26b, a combination of identification information (hereinafter referred to as an "equipment ID") of the MFP, and an Internet protocol (IP) address of the MFP is shown. In the target device information 26b illustrated in FIG. 3, an MFP having an equipment ID "A" and an MFP having an equipment ID "B" are shown. The MFP shown in the target device information 26b is specified by a user, for example, via the operation unit 21.

As illustrated in FIG. 2, the storage unit 26 is configured to store a noise-cause process table 26c that shows an interference process that interferes with the audio input, that is, a process that is a cause of noise with respect to the audio input.

FIG. 4 illustrates an exemplary noise-cause process table 26c.

As illustrated in FIG. 4, in the noise-cause process table 26c, a combination of the equipment ID of the MFP, a process name of the process that was being executed by the MFP, and an input sound volume of the microphone 23 is shown. In the noise-cause process table 26c illustrated in FIG. 4, for example, a combination of the equipment ID "A," a process name "a," and an input sound volume "80 dB" is shown. The process names are shown by one lower-case alphabet such as "a," "b," and "c" in FIG. 4. However, in practice, specific process names such as "calibration" and "print" are shown. The audio input apparatus 20 is positioned at a position that ensures the short range wireless communication in the peer-to-peer system with the operated MFP. Thus, for example, when the MFP 30 and the other MFP are scattered within an identical floor, the input sound volume differs depending on which MFP is operated by the audio input. Therefore, in the embodiment, the noise-cause process table 26c is created by MFPs operated by the audio input from the audio input apparatus 20.

The control unit 27 can display a content of the noise-cause process table 26c on the display 22, for example, corresponding to an instruction from the operation unit 21. Accordingly, the user can confirm information such as the input sound volume of the microphone 23 with respect to the interference process.

As illustrated in FIG. 2, the storage unit 26 is configured to store a small-sound-volume process table 26d that shows a process that does not interfere with the audio input, that is, a process having a small sound volume.

FIG. 5 illustrates an exemplary small-sound-volume process table 26d.

As illustrated in FIG. 5, in the small-sound-volume process table 26d, a combination of the equipment ID of the MFP, the process name of the process that was being executed by the MFP, and the input sound volume of the microphone 23 is shown. In the small-sound-volume process table 26d illustrated in FIG. 5, for example, a combination of the equipment ID "A," a process name "c," and an input sound volume "40 dB" is shown. In the embodiment, the small-sound-volume process table 26d, similarly to the noise-cause process table 26c, is created by MFPs operated by the audio input from the audio input apparatus 20.

The control unit 27 can display a content of the small-sound-volume process table 26d on the display 22, for example, corresponding to the instruction from the operation unit 21. Accordingly, the user can confirm information such as the input sound volume of the microphone 23 with respect to the process that is not the interference process.

The control unit 27 illustrated in FIG. 2 includes, for example, a central processing unit (CPU), a read-only memory (ROM) that stores a program and various data, and a random-access memory (RAM) used as a work area of the CPU. The CPU executes the program stored in the ROM or the storage unit 26.

The control unit 27 executes the audio input program 26a to ensure an audio input unit 27a, a start-instruction accepting unit 27b, an instruction transmitter 27c, and an interference-process management unit 27d. The audio input unit 27a receives audio via the microphone 23. The start-instruction accepting unit 27b accepts the audio-input start instruction by the audio input unit 27a. The instruction transmitter 27c transmits the instruction to the MFP 30. The interference-process management unit 27d manages the interference process that interferes with the audio input.

Figure 6:
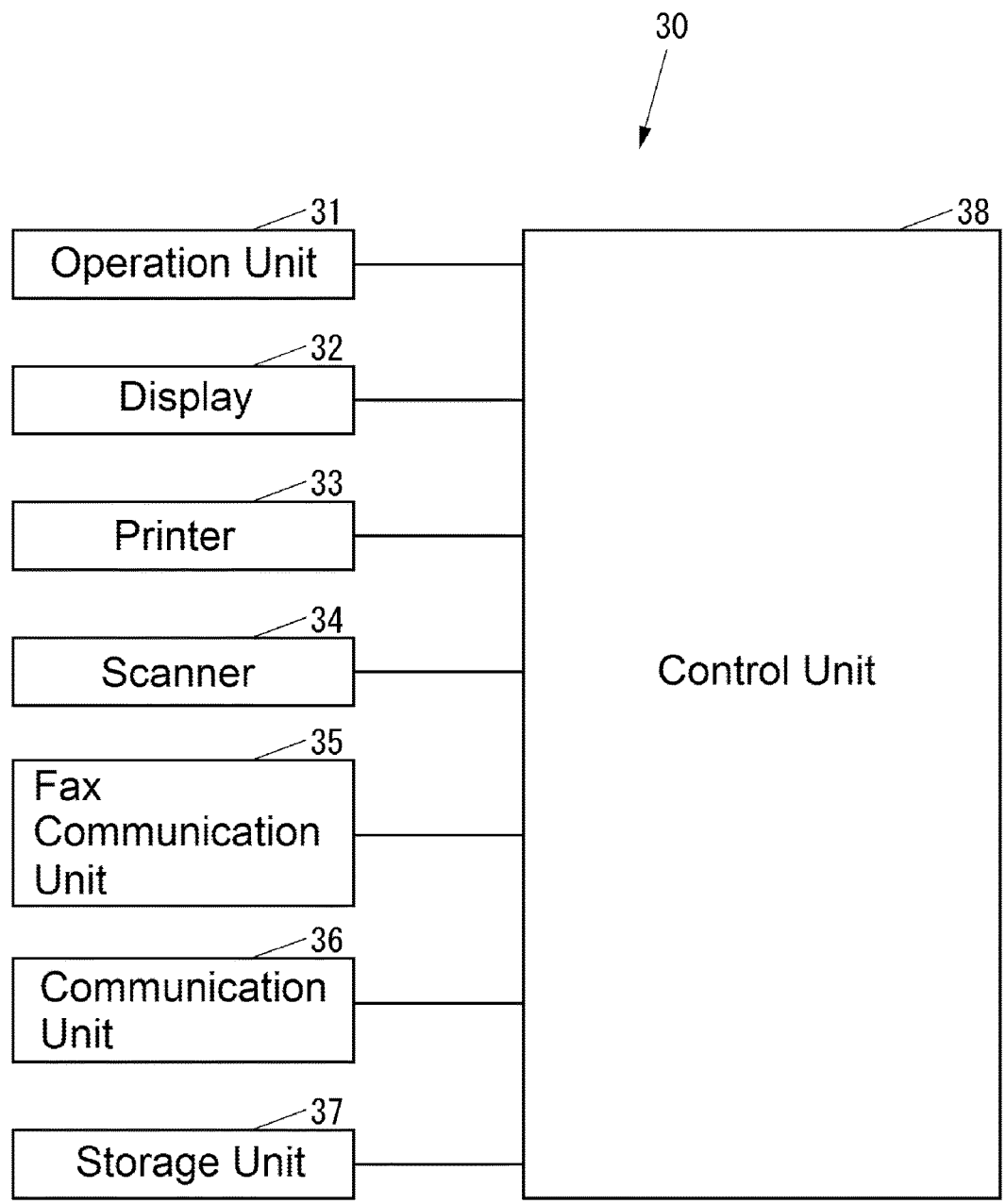
FIG. 6 illustrates a block diagram of an MFP according to the one embodiment.

FIG. 6 illustrates a block diagram of the MFP 30.

As illustrated in FIG. 6, the MFP 30 includes an operation unit 31, a display 32, a printer 33, a scanner 34, a fax communication unit 35, a communication unit 36, a storage unit 37, and a control unit 38. The operation unit 31 is an input device as a button to which various operations are input and may be used as an audio input apparatus. The display 32 is a display device such as an LCD that displays various information. The printer 33 is a print device that prints an image on a recording medium such as a paper sheet. The scanner 34 is a reading device that reads an image from an original document. The fax communication unit 35 is a fax device that performs fax communication with an external facsimile device (not illustrated) via a communication line such as a dial-up line. The communication unit 36 is a communication device that communicates with an external device via the network, or directly by wire or without wire without using the network. The storage unit 37 is a non-volatile storage device such as a semiconductor memory or an HDD that stores various information. The control unit 38 controls whole of the MFP 30.

The communication unit 36 can be connected to the audio input apparatus 20 by the short range wireless communication in the peer-to-peer system (for example, Bluetooth™ or Wi-Fi™ direct), or can be connected to the audio input apparatus 20 by the wireless communication (for example, wireless LAN) via the network. A communication unit of the MFP other than the MFP 30 similar to the MFP 30 can be connected to the audio input apparatus 20 by the wireless communication (for example, wireless LAN) via the network.

The control unit 38 includes, for example, a CPU, a ROM that stores a program and various data, and a RAM used as a work area of the CPU. The CPU executes the program stored in the ROM or the storage unit 37.

Among the processes executed by the MFP 30, as a process that possibly becomes the cause of the noise with respect to the audio input by the audio input apparatus 20, for example, there are a "calibration" as a color adjustment process of the printer 33 for improving reproducibility of a color printed on the recording medium by the printer 33, and a "print" as a process that prints an image corresponding to print data on the recording medium by the printer 33.

The MFP 30 is configured to at least transfer from a normal mode to a sound reduction mode where the execution of many processes is reduced compared with the normal mode. In the sound reduction mode, for example, the "calibration" is not executed, and the "print" is quietly executed compared with the normal mode.

The following describes an operation of the audio input system 10.

Figure 7:
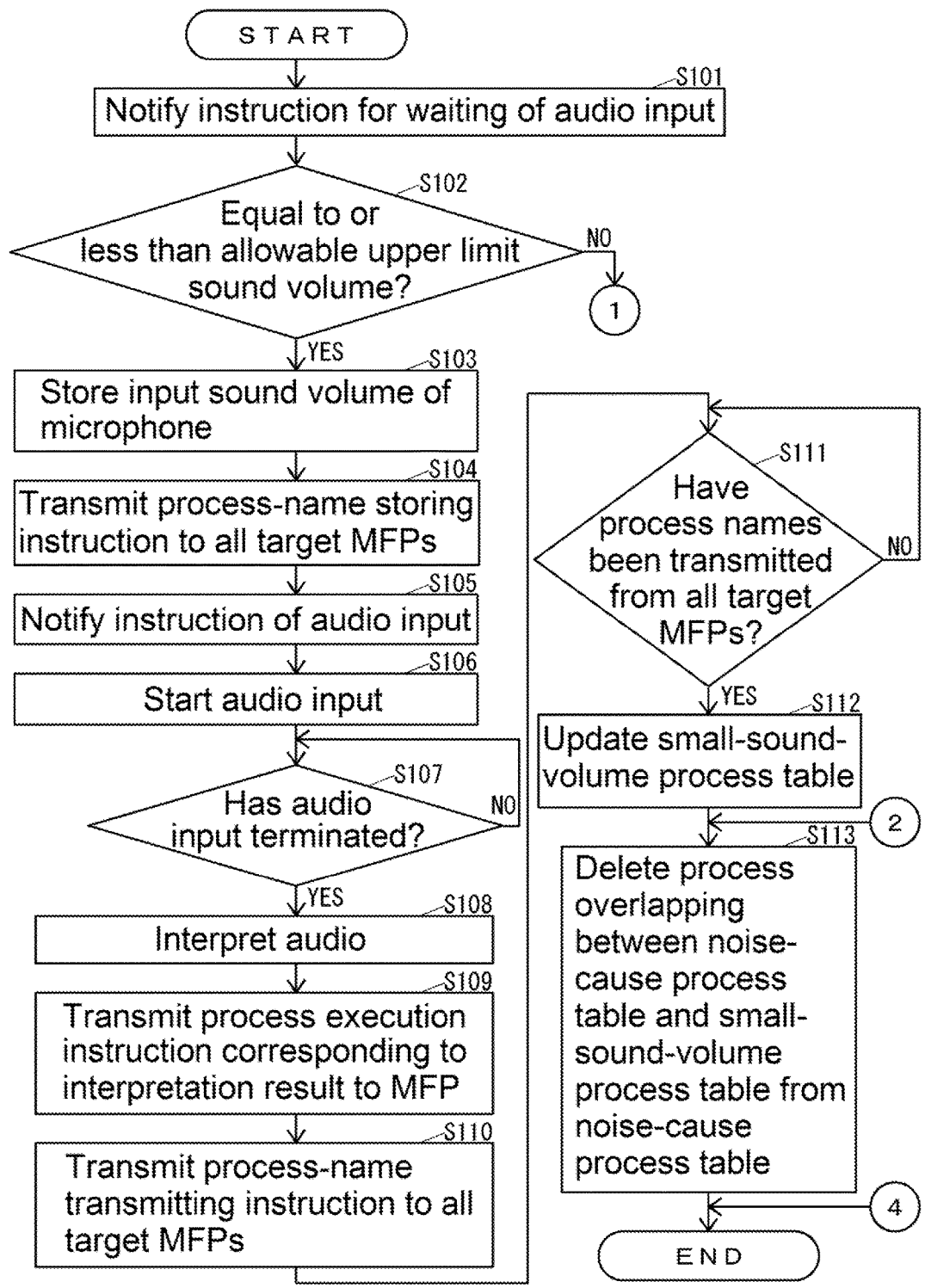
FIG. 7 illustrates a part of an operation of the audio input apparatus according to the one embodiment when audio is input.
Figure 8:
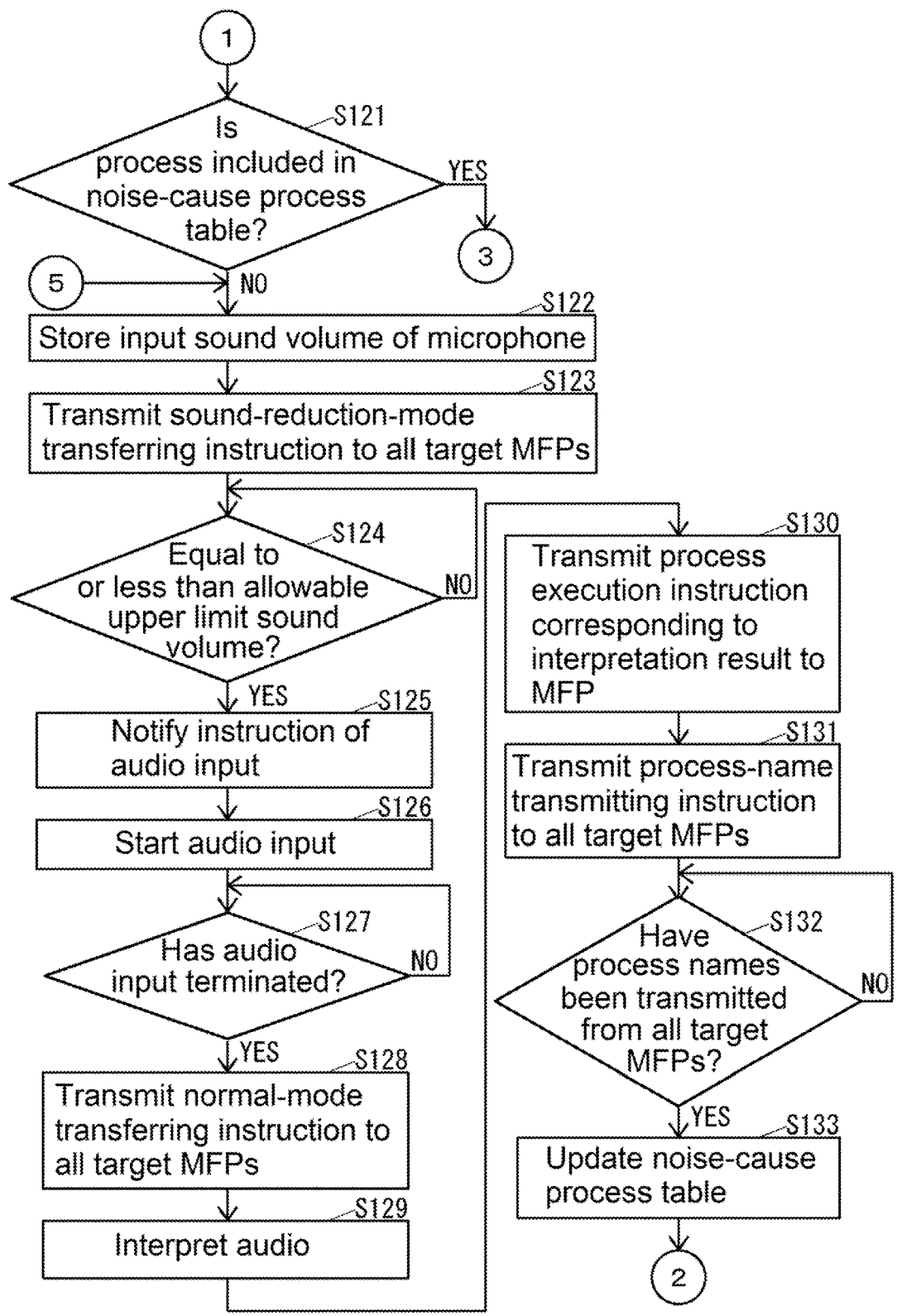
FIG. 8 illustrates an operation subsequent to the operation illustrated in FIG. 7.
Figure 9:
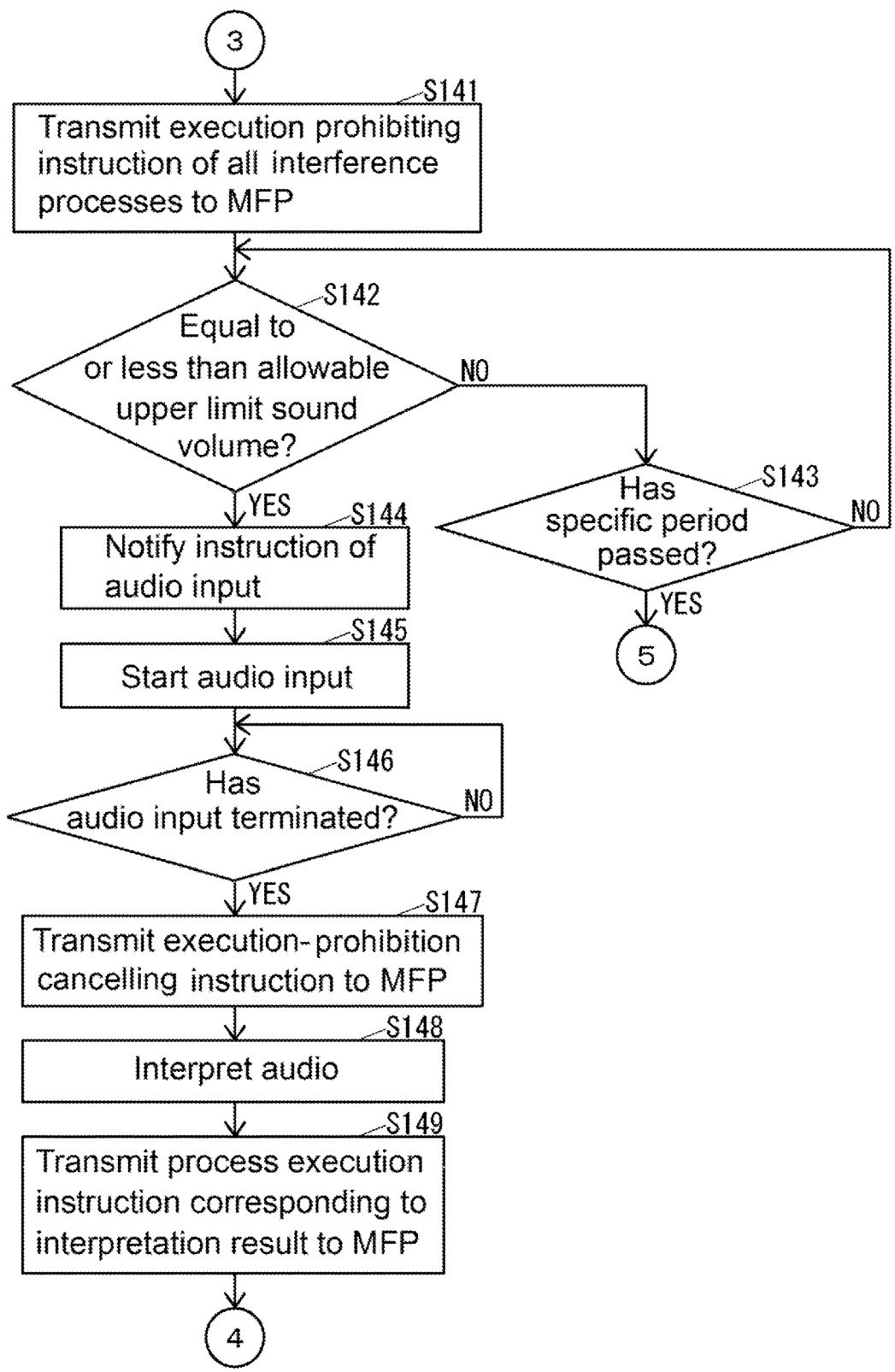
FIG. 9 illustrates an operation subsequent to the operation illustrated in FIG. 8.

FIGS. 7 to 9 illustrate an operation of the audio input apparatus 20 when the audio is input. In the embodiment, it is assumed that the user having the audio input apparatus 20 is attempting to operate the MFP 30 by the audio input, at the proximity of the MFP 30 (That is, the audio input apparatus 20 and the MFP 30 have the positional relationship that can perform the short range wireless communication in the peer-to-peer system one another.). Therefore, the audio input apparatus 20 uses the noise-cause process table 26c and the small-sound-volume process table 26d for the MFP 30. It is assumed that, before Step S101 in the flowchart illustrated in FIG. 7 or before the audio input starts, connection by the short range wireless communication in the peer-to-peer system between the audio input apparatus 20 and the MFP 30 has been established. It is assumed that the MFP 30 and the other MFPs (Here, a description will be given on the assumption that there are a plurality of other MFPs.) are included in the target device information 26b.

The user can press the audio-input start button 21a of the audio input apparatus 20. The start-instruction accepting unit 27b of the audio input apparatus 20, after the audio-input start button 21a is pressed, accepts the audio-input start instruction by the audio input unit 27a to execute the operation illustrated in FIGS. 7 to 9. The audio-input start button 21a may be a hardware key, or may be a virtual key generated on a screen displayed on the display 22.

As illustrated in FIGS. 7 to 9, by the screen displayed on the display 22, the audio input unit 27a notifies an instruction for waiting of the audio input via the microphone 23 (Step S101). Accordingly, the user can wait for the start of the audio input to the microphone 23.

Next, the instruction transmitter 27c determines whether the input sound volume of the microphone 23 is equal to or less than a specific sound volume (hereinafter referred to as an "allowable upper limit sound volume") or not (Step S102). Here, the allowable upper limit sound volume is a maximum input sound volume that does not interfere with the audio input via the microphone 23.

When it is determined that the input sound volume of the microphone 23 is equal to or less than the allowable upper limit sound volume, that is, a loudness of sound around the audio input apparatus 20 is equal to or less than the allowable upper limit sound volume at Step S102, the interference-process management unit 27d stores the input sound volume of the microphone 23 (Step S103).

Next, the instruction transmitter 27c transmits a process-name storing instruction for storing the process name of the process in execution to all the MFPs shown in the target device information 26b (that is, the MFP 30 and other all MFPs) (Step S104). Here, the instruction transmitter 27c uses the IP address shown in the target device information 26b, as a transmission destination address of the process-name storing instruction.

Figure 10:
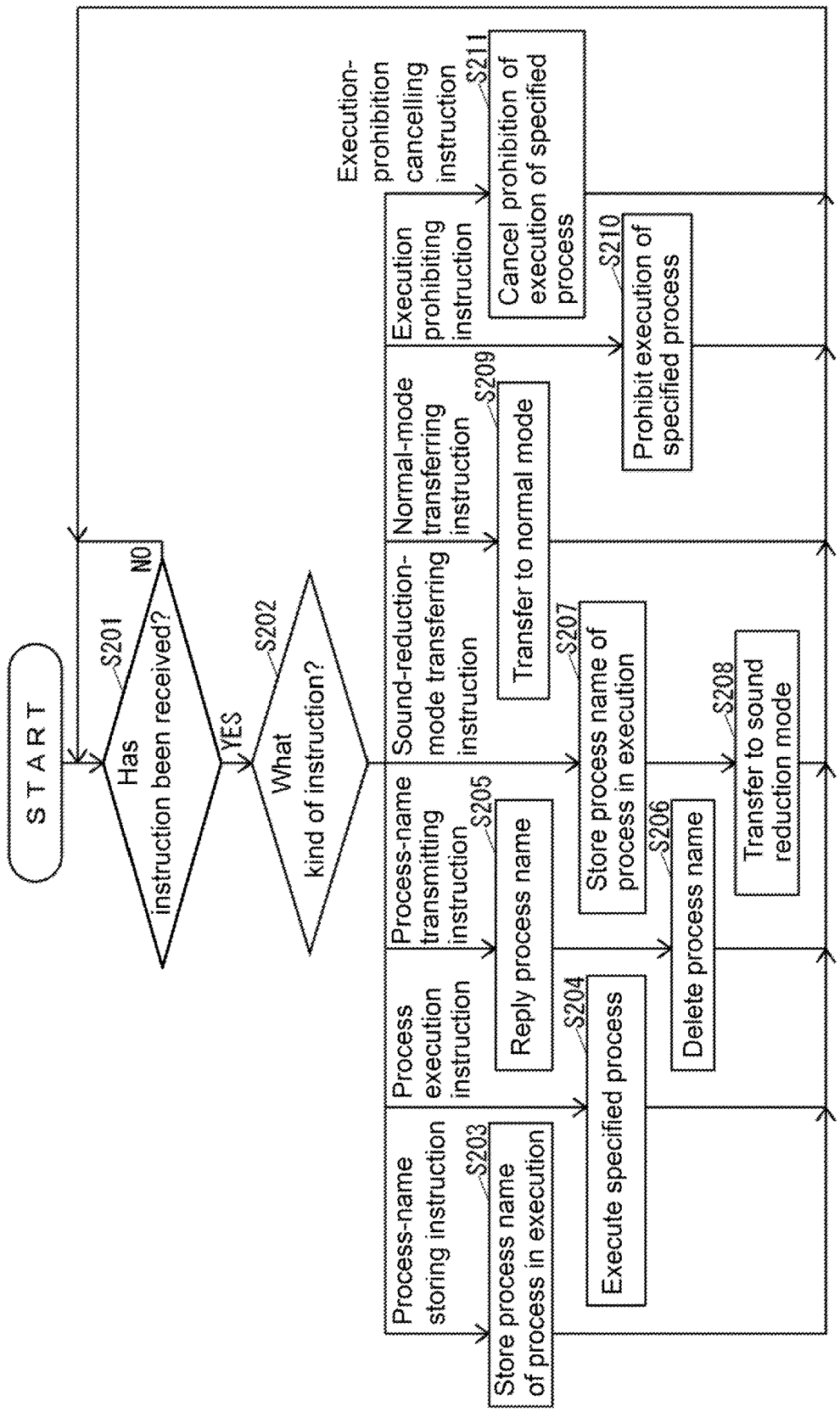
FIG. 10 illustrates an operation of the MFP according to the one embodiment.

FIG. 10 illustrates an operation of the MFP.

As illustrated in FIG. 10, the control unit of the MFP determines whether the instruction has been received or not until the control unit of the MFP determines that the instruction has been received (Step S201).

When the control unit of the MFP determines that the instruction has been received at Step S201, the control unit of the MFP determines a kind of the received instruction (Step S202).

When the control unit of the MFP determines that the kind of the received instruction is the process-name storing instruction at Step S202, the control unit of the MFP stores the process name of the process in execution in the storage unit of the MFP itself (Step S203) to execute the process of Step S201.

As illustrated in FIGS. 7 to 9, after the process at Step S104, the audio input unit 27a notifies the instruction of the audio input via the microphone 23 by the screen displayed on the display 22 and the audio output from the speaker 24 (Step S105) to start the audio input via the microphone 23 (Step S106). Accordingly, the user can start the audio input to the microphone 23.

Next, the audio input unit 27a determines whether the audio input has terminated or not, for example, based on the input sound volume of the microphone 23, until the audio input unit 27a determines that the audio input has terminated (Step S107). Here, the audio input unit 27a may determine that the audio input has determined, such that an audio-input finish button of the operation unit 21 is pressed, or such that the audio input unit 27a determines that there is no audio input via the microphone 23 for a specific period.

When the audio input unit 27a determines that the audio input has terminated at Step S107, the audio input unit 27a interprets the audio input via the microphone 23 (Step S108).

Next, the instruction transmitter 27c transmits a process execution instruction for executing a process corresponding to an interpretation result at Step S108 to the MFP 30 by the short range wireless communication in the peer-to-peer system (Step S109).

As illustrated in FIG. 10, after the control unit 38 of the MFP 30 determines that the instruction has been received at Step S201, when the control unit 38 determines that the kind of the received process is the process execution instruction at Step S202, the control unit 38 executes the process specified in the process execution instruction (Step S204) to execute the process of Step S201.

As illustrated in FIGS. 7 to 9, the instruction transmitter 27c, after the process at Step S109, transmits a process-name transmitting instruction for transmitting the process name to all the MFPs shown in the target device information 26b via the network (Step S110). Here, the instruction transmitter 27c uses the IP address shown in the target device information 26b, as the transmission destination address of the process-name transmitting instruction.

As illustrated in FIG. 10, when each of the control units of all the MFPs shown in the target device information 26b, after determining that the instruction has been received at Step S201, determines that the kind of the received process is the process-name transmitting instruction at Step S202, after replying the process name stored in the storage unit of the MFP itself (Step S205), each of the control units deletes the process name stored in the storage unit of the MFP itself (Step S206) to execute the process of Step S201.

As illustrated in FIGS. 7 to 9, the interference-process management unit 27d, after the process at Step S110, determines whether the process names have been transmitted from all the MFPs shown in the target device information 26b or not, until the interference-process management unit 27d determines that the process names have been transmitted from all the MFPs shown in the target device information 26b (Step S111).

When the interference-process management unit 27d determines that the process names have been transmitted from all the MFPs shown in the target device information 26b at Step S111, the interference-process management unit 27d updates the small-sound-volume process table 26d based on a combination of the respective equipment IDs shown in the target device information 26b, the process names transmitted from the MFPs having these equipment IDs, and the input sound volumes stored at Step S103 (Step S112). Here, when the interference-process management unit 27d updates the small-sound-volume process table 26d, if there are a new "combination of the equipment ID, the process name, and the input sound volume" and an old "combination of the equipment ID, the process name, and the input sound volume" whose combinations of the equipment ID and the process name are common in the small-sound-volume process table 26d, the interference-process management unit 27d overwrites the old "combination of the equipment ID, the process name, and the input sound volume" with the new "combination of the equipment ID, the process name, and the input sound volume."

Next, the interference-process management unit 27d deletes the process that overlaps between the noise-cause process table 26c and the small-sound-volume process table 26d from the noise-cause process table 26c (Step S113). That is, the interference-process management unit 27d deletes the combination whose combination of the equipment ID and the process name is also included in the small-sound-volume process table 26d, among the combinations of the equipment ID, the process name, and the input sound volume in the noise-cause process table 26c, from the noise-cause process table 26c.

For example, when the noise-cause process table 26c is that illustrated in FIG. 11, and the small-sound-volume process table 26d is that illustrated in FIG. 5, the process of the process name "b" of the MFP having the equipment ID "B" is included in both of the noise-cause process table 26c and the small-sound-volume process table 26d. Thus, the interference-process management unit 27d deletes the process of the process name "b" of the MFP having the equipment ID "B" from the noise-cause process table 26c as illustrated in FIG. 4. Thus, the process whose input sound volume has proved to be equal to or less than the allowable upper limit sound volume, even though it is the process registered in the noise-cause process table 26c as the interference process, can be managed in the small-sound-volume process table 26d as the process that does not interfere with the audio input.

As illustrated in FIGS. 7 to 9, after the process at Step S113, the control unit 27 terminates the operation illustrated in FIGS. 7 to 9.

When the instruction transmitter 27c determines that the input sound volume of the microphone 23 exceeds the allowable upper limit sound volume, that is, the loudness of sound around the audio input apparatus 20 exceeds the allowable upper limit sound volume at Step S102, the instruction transmitter 27c determines whether the process is included in the noise-cause process table 26c or not (Step S121).

When it is determined that the process is not included in the noise-cause process table 26c, that is, the interference-process management unit 27d does not manage the interference process at Step S121, the interference-process management unit 27d stores the input sound volume of the microphone 23 (Step S122).

Next, the instruction transmitter 27c transmits a sound-reduction-mode transferring instruction for transferring to the sound reduction mode, as a process reducing instruction for reducing the process execution, to all the MFPs shown in the target device information 26b via the network (Step S123). Here, the instruction transmitter 27c uses the IP address shown in the target device information 26b, as the transmission destination address of the sound-reduction-mode transferring instruction.

As illustrated in FIG. 10, when each of the control units of all the MFPs shown in the target device information 26b, after determining that the instruction has been received at Step S201, determines that the kind of the received process is the sound-reduction-mode transferring instruction at Step S202, after storing the process name of the process in execution in the storage unit of the MFP itself (Step S207), each of the control units transfers the MFP itself to the sound reduction mode (Step S208) to execute the process of Step S201.

As illustrated in FIGS. 7 to 9, after the process at Step S123, the audio input unit 27a determines whether the input sound volume of the microphone 23 is equal to or less than the allowable upper limit sound volume or not, until the input sound volume of the microphone 23 becomes equal to or less than the allowable upper limit sound volume (Step S124).

When the control unit 27 determines that the input sound volume of the microphone 23 is equal to or less than the allowable upper limit sound volume at Step S124, the control unit 27 executes Steps S125 to S127 similarly to Steps S105 to S107.

When it is determined that the audio input has terminated at Step S127, the instruction transmitter 27c transmits a normal-mode transferring instruction for transferring to the normal mode to all the MFPs shown in the target device information 26b via the network (Step S128). Here, the instruction transmitter 27c uses the IP address shown in the target device information 26b, as the transmission destination address of the normal-mode transferring instruction.

As illustrated in FIG. 10, when each of the control units of all the MFPs shown in the target device information 26b, after determining that the instruction has been received at Step S201, determines that the kind of the received process is the normal-mode transferring instruction at Step S202, each of the control units transfers the MFP itself to the normal mode (Step S209) to execute the process of Step S201.

As illustrated in FIGS. 7 to 9, after the process at Step S128, the control unit 27 executes Steps S129 to S132 similarly to Steps S108 to S111.

When the interference-process management unit 27d determines that the process names have been transmitted from all the MFPs shown in the target device information 26b at Step S132, the interference-process management unit 27d updates the noise-cause process table 26c based on the combination of the respective equipment IDs shown in the target device information 26b, the process names transmitted from the MFPs having these equipment IDs, and the input sound volumes stored at Step S122, that is, the input sound volumes of the microphone 23 at the point when the MFP was executing the interference process (Step S133). Here, when the interference-process management unit 27d updates the noise-cause process table 26c, if there are a new "combination of the equipment ID, the process name, and the input sound volume" and an old "combination of the equipment ID, the process name, and the input sound volume" whose combinations of the equipment ID and the process name are common in the noise-cause process table 26c, the interference-process management unit 27d overwrites the old "combination of the equipment ID, the process name, and the input sound volume" with the new "combination of the equipment ID, the process name, and the input sound volume."

Next, the interference-process management unit 27d executes Step S113.

When the instruction transmitter 27c determines that at least one process is included in the noise-cause process table 26c, that is, the interference-process management unit 27d manages the interference process at Step S121, the instruction transmitter 27c transmits an execution prohibiting instruction for prohibiting the execution of the interference process as the process reducing instruction to the MFP associated with the interference process in the noise-cause process table 26c, for each of all the interference processes included in the noise-cause process table 26c (Step S141). Here, the instruction transmitter 27c uses the IP address shown in the target device information 26b, as the transmission destination address of the execution prohibiting instruction.

As illustrated in FIG. 10, each of the control units of all the MFPs associated with the interference process, after determining that the instruction has been received at Step S201, when determining that the kind of the received process is the execution prohibiting instruction at Step S202, prohibits the MFP itself from executing the process specified in the execution prohibiting instruction (Step S210) to execute the process of Step S201.

As illustrated in FIGS. 7 to 9, after the process at Step S141, the audio input unit 27a determines whether the input sound volume of the microphone 23 is equal to or less than the allowable upper limit sound volume or not (Step S142).

When it is determined that the input sound volume of the microphone 23 exceeds the allowable upper limit sound volume at Step S142, the instruction transmitter 27c determines whether a specific period (for example, a period set at a few seconds to a few tens of seconds) has passed from the process at Step S141 or not (Step S143).

When it is determined that the specific period has not passed from the process at Step S141 at Step S143, the audio input unit 27a executes the process of Step S142.

When the control unit 27 determines that the input sound volume of the microphone 23 is equal to or less than the allowable upper limit sound volume at Step S142, the control unit 27 executes Steps S144 to S146 similarly to Steps S105 to S107.

When it is determined that the audio input has terminated at Step S146, the instruction transmitter 27c transmits an execution-prohibition cancelling instruction for cancelling the execution prohibiting instruction transmitted by the process at Step S141, to all the MFPs to which the execution prohibiting instruction is transmitted by the process at Step S141 in the operation illustrated in FIGS. 7 to 9 in this time, via the network (Step S147). Here, the instruction transmitter 27c uses the IP address shown in the target device information 26b, as the transmission destination address of the execution-prohibition cancelling instruction.

As illustrated in FIG. 10, each of the control units of all the MFPs that are prohibiting the process execution specified in the execution prohibiting instruction, after determining the instruction has been received at Step S201, when determining that the kind of the received process is the execution-prohibition cancelling instruction at Step S202, cancels the prohibition for the MFP itself from executing the process specified in the execution-prohibition cancelling instruction (Step S211) to execute the process of Step S201. At this time, the control unit of the MFP may resume the execution of the process under suspension.

As illustrated in FIGS. 7 to 9, after the process at Step S147, the control unit 27 executes Steps S148 and S149 similarly to Steps S108 and S109 to terminate the operation illustrated in FIGS. 7 to 9.

When the instruction transmitter 27c determines that the specific period has passed from the process at Step S141 at Step S143, the instruction transmitter 27c executes the process of Step S122. Accordingly, when the input sound volume of the microphone 23 exceeds the allowable upper limit sound volume by a specific timing after the transmission of the execution prohibiting instruction (Step S141), that is, a timing when the specific period has passed (YES at Step S143), the interference-process management unit 27d manages the process that was being executed by the MFP at the specific timing as the interference process (Step S133).

As described above, when the input sound volume of the microphone 23 is equal to or less than the allowable upper limit sound volume after the reception by the audio input apparatus 20 of the audio-input start instruction (YES at Step S102), the audio input system 10 starts the audio input by the audio input apparatus 20, without transmitting the process reducing instruction for reducing the process execution from the audio input apparatus 20 to the plurality of MFPs (Step S106). This can prevent the process execution by each of the plurality of MFPs from being reduced more than necessary because of the audio input by the audio input apparatus 20.

When the input sound volume of the microphone 23 exceeds the allowable upper limit sound volume after the reception by the audio input apparatus 20 of the audio-input start instruction (NO at Step S102), the execution prohibiting instruction for prohibiting the execution of the process managed as the interference process that interferes with the audio input is transmitted to the plurality of MFPs by the audio input apparatus 20 (Step S141). Thus, the audio input system 10 can reduce a possibility that the process executed by each of the plurality of MFPs interferes with the audio input by the audio input apparatus 20.

When the audio input by the audio input apparatus 20 terminates (YES at Step S146), the execution-prohibition cancelling instruction that cancels the prohibition of the execution of the interference process that interferes with the audio input is transmitted to the plurality of MFPs by the audio input apparatus 20 (Step S147). Thus, the audio input system 10 can cause each of the plurality of MFPs to halt the interference process, until the audio input by the audio input apparatus 20 terminates.

When the audio input system 10 does not manage the interference process (NO at Step S121) when the input sound volume of the microphone 23 exceeds the allowable upper limit sound volume after the reception by the audio input apparatus 20 of the audio-input start instruction (NO at Step S102), and when the input sound volume of the microphone 23 exceeds the allowable upper limit sound volume (YES at Step S143) until the specific timing after the transmission of the execution prohibiting instruction to the plurality of MFPs by the audio input apparatus 20 (Step S141), that is, the timing that the specific period has passed, the sound-reduction-mode transferring instruction is transmitted to the plurality of MFPs by the audio input apparatus 20 (Step S123). Thus, the audio input system 10 can enhance possibility that the process by each of the plurality of MFPs is quietly executed without being halted during the audio input by the audio input apparatus 20. That is, the audio input system 10 can reduce a possibility that the process execution by each of the plurality of MFPs is prohibited more than necessary because of the audio input by the audio input apparatus 20.

The audio input apparatus 20 manages the interference process corresponding to the MFP that is the target for the process execution instruction. Thus, when the plurality of MFPs are scattered, the audio input system 10 can appropriately reduce the process execution by the plurality of MFPs even though the audio input system 10 operates any MFP by the audio input.

When the input sound volume of the microphone 23 is equal to or less than the allowable upper limit sound volume immediately after the reception by the audio input apparatus 20 of the audio-input start instruction (YES at Step S102), the audio input system 10 manages the process that is being executed by each of the plurality of MFPs immediately after the reception by the audio input apparatus 20 of the audio-input start instruction as a process that is not the interference process (Step S112). Thus, an accuracy in management of the interference process can be improved. Accordingly, the audio input system 10 can reduce the possibility that the process execution by each of the plurality of MFPs is prohibited more than necessary because of the audio input by the audio input apparatus 20.

When the process managed as the interference process overlaps the process managed as not the interference process, the audio input system 10 manages the overlapping process as only the process that is not the interference process. Thus, the audio input system 10 can manage the process whose input sound volume has proved to be equal to or less than the allowable upper limit sound volume, even though it is the process managed as the interference process, as the process that does not interfere with the audio input.

The audio input apparatus 20 manages the process that is not the interference process corresponding to the MFP that is the target for the process execution instruction. Thus, when the plurality of MFPs are scattered, the audio input system 10 can appropriately reduce the process execution by the plurality of MFPs even though the audio input system 10 operates any MFP by the audio input.

The audio input apparatus 20 transmits the process execution instruction to the MFP by the wireless communication in the peer-to-peer system. Thus, such that a position where the audio input by the audio input apparatus 20 is executed is limited to the proximity of the target MFP of the process execution instruction, the audio input system 10 can reduce variation of the input audio by processes of the plurality of MFPs. As a result, the audio input system 10 can appropriately reduce the process execution by the plurality of MFPs.

The audio input system 10 may have a configuration where the MFP manages the interference process.

In the embodiment, when the input sound volume of the microphone 23 exceeds the allowable upper limit sound volume after the reception by the audio input apparatus 20 of the audio-input start instruction (NO at Step S102), the audio input system 10 transmits the execution prohibiting instruction to the MFP associated with the interference process in the noise-cause process table 26c, for each of all the interference processes included in the noise-cause process table 26c (Step S141). However, when the input sound volume of the microphone 23 exceeds the allowable upper limit sound volume after the reception by the audio input apparatus 20 of the audio-input start instruction (NO at Step S102), as Illustrated in FIG. 12, the audio input system 10 may transmit the execution prohibiting instruction to the MFP in descending order of the input sound volume of the interference process associated in the noise-cause process table 26c.

Figure 12:
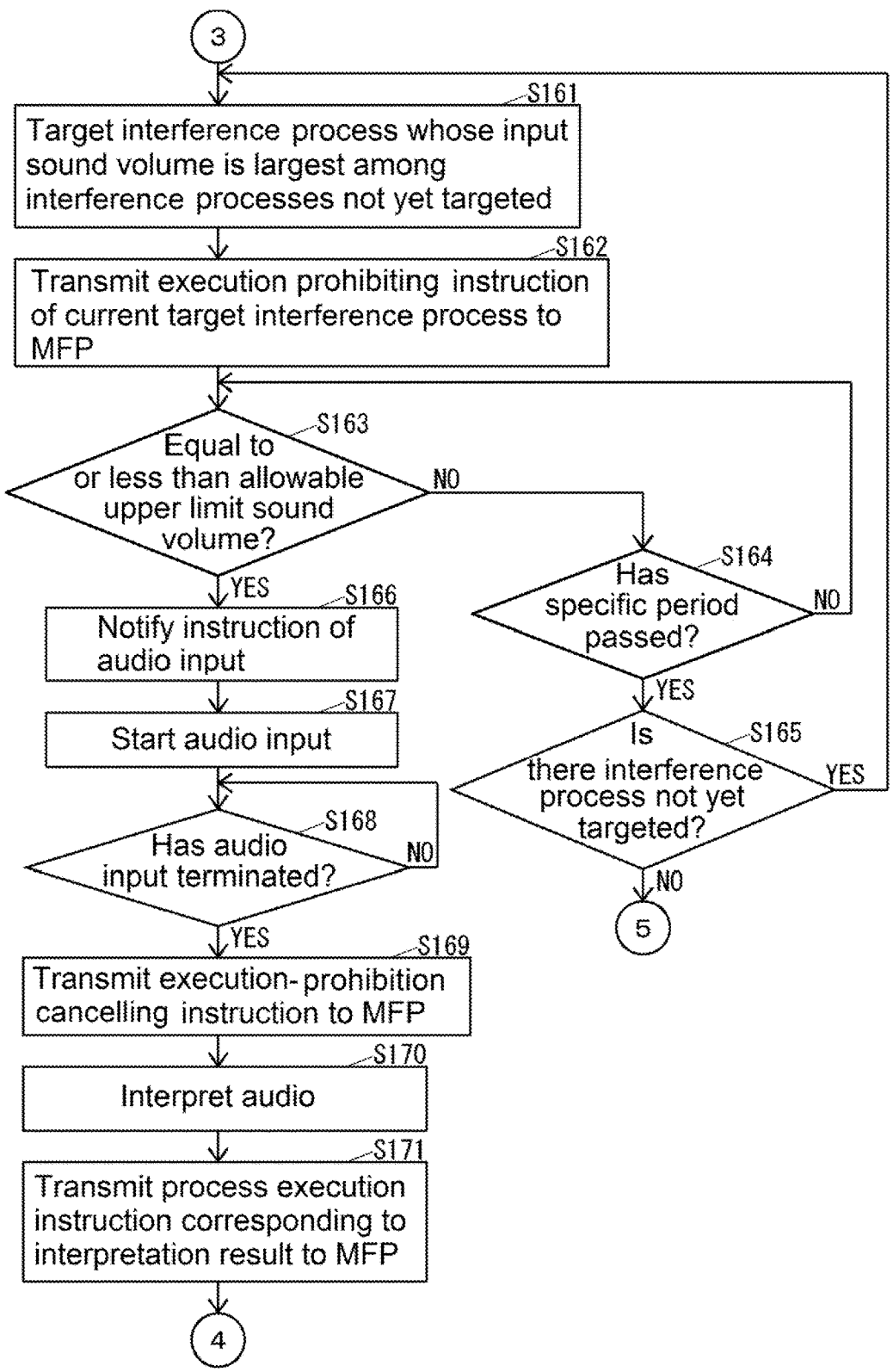
FIG. 12 illustrates a modification of the operation illustrated in FIG. 9.

FIG. 12 illustrates a modification of the operation illustrated in FIG. 9.

When the instruction transmitter 27c determines that at least one process is included in the noise-cause process table 26c, that is, the interference-process management unit 27d manages the interference process at Step S121, as illustrated in FIG. 12, the instruction transmitter 27c targets the interference process whose input sound volume associated in the noise-cause process table 26c is largest, among the interference processes that are included in the noise-cause process table 26c, and have not yet targeted in the operation Illustrated in FIG. 12 in this time (Step S161).

Next, the instruction transmitter 27c transmits the execution prohibiting instruction for prohibiting the execution of the current target interference process, as the process reducing instruction, to the MFP having the equipment ID with which the current target interference process is associated in the noise-cause process table 26c, via the network (Step S162). Here, the instruction transmitter 27c uses the IP address shown in the target device information 26b, as the transmission destination address of the execution prohibiting instruction.

Next, the audio input unit 27a determines whether the input sound volume of the microphone 23 is equal to or less than the allowable upper limit sound volume or not (Step S163).

When it is determined that the input sound volume of the microphone 23 exceeds the allowable upper limit sound volume at Step S163, the instruction transmitter 27c determines whether the specific period has passed from the process at previous Step S162 or not (Step S164). Here, the specific period is, for example, a period such as three seconds and five seconds.

When it is determined that the specific period has not passed from the process at previous Step S162 at Step S164, the audio input unit 27a executes the process of Step S163.

When the instruction transmitter 27c determines that the specific period has passed from the process at previous Step S162 at Step S164, the instruction transmitter 27c determines whether there is the interference process that is included in the noise-cause process table 26c, and has not yet targeted in the operation illustrated in FIG. 12 in this time or not (Step S165).

When the instruction transmitter 27c determines that there is the interference process not yet targeted in the operation illustrated in FIG. 12 in this time at Step S165, the instruction transmitter 27c executes the process of Step S161.

When the control unit 27 determines that the input sound volume of the microphone 23 is equal to or less than the allowable upper limit sound volume at Step S163, the control unit 27 executes Steps S166 to S168 similarly to Steps S105 to S107.

When it is determined that the audio input has terminated at Step S168, the instruction transmitter 27c transmits the execution-prohibition cancelling instruction for cancelling the execution prohibiting instruction transmitted by the process at Step S162 to all the MFPs to which the execution prohibiting instruction is transmitted by the process at Step S162 in the operation Illustrated in FIG. 12 in this time, via the network (Step S169). Here, the instruction transmitter 27c uses the IP address shown in the target device information 26b, as the transmission destination address of the execution-prohibition cancelling instruction.

Next, the control unit 27 executes Steps S170 and S171 similarly to Steps S108 and S109 to terminate the operation illustrated in FIGS. 7, 8, and 12.

When the instruction transmitter 27c determines that there is no interference process not yet targeted in the operation Illustrated in FIG. 12 in this time at Step S165, the instruction transmitter 27c executes the process of Step S122.

When the audio input apparatus 20 executes the operation Illustrated in FIG. 12 instead of the operation illustrated in FIG. 9, if the input sound volume of the microphone 23 exceeds the allowable upper limit sound volume after the reception by the audio input apparatus 20 of the audio-input start instruction (NO at Step S102), the audio input apparatus 20 transmits the execution prohibiting instruction in descending order of the input sound volume of the interference process associated in the noise-cause process table 26c to the MFP corresponding to the interference process according to the order (Steps S161 to S165). Thus, the audio input system 10 can reduce a possibility that the execution of all the managing interference processes is prohibited.

In the embodiment, the sound reduction mode is a mode where the execution of many processes is reduced compared with the normal mode, but may be a mode where the execution of at least one process is reduced compared with the normal mode.

At Step S124 illustrated in FIG. 8, when the audio input unit 27a determines that the input sound volume of the microphone 23 is continuously exceeding the allowable upper limit sound volume for the specific period (for example, the period set at a few seconds to a few tens of seconds), the instruction transmitter 27c may transmit the process halting instruction for halting the process execution, as the process reducing instruction for reducing the process execution, to all the MFPs shown in the target device information 26b, via the network. In this case, the control unit 27, after transmitting the process halting instruction, executes the process of Step S125. Each of the control units of all the MFPs that have accepted the process halting instruction, after executing the process similar to that at Step S207 illustrated in FIG. 10, halts the process in execution. Then, each of the control units of all the MFPs that have halted the process in execution, after accepting the normal-mode transferring instruction, executes the process of Step S209. At this time, each of the control units of all the MFPs that have halted the process in execution may resume the execution of the process under suspension.

Based on the execution prohibiting instruction transmitted from the audio input apparatus 20 at Step S141 illustrated in FIG. 9, the control unit of the MFP that has halted the process execution may execute the process of Step S209 illustrated in FIG. 10 to transfer the MFP itself to the normal mode, based on the normal-mode transferring instruction transmitted from the audio input apparatus 20 at Step S128 illustrated in FIG. 8, and execute the process of Step S211 to resume the execution of the process under suspension.

At Step S128 illustrated in FIG. 8 after Step S143 illustrated in FIG. 9, the instruction transmitter 27c may transmit the normal-mode transferring instruction for transferring to the normal mode, to all the MFPs shown in the target device information 26b, via the network, and transmit the execution-prohibition cancelling instruction for cancelling the execution prohibiting instruction transmitted by the process at Step S141, to all the MFPs to which the execution prohibiting instruction is transmitted by the process at Step S141 illustrated in FIG. 9, via the network. In this case, the control unit of the MFP that has accepted the normal-mode transferring instruction transfers the MFP itself to the normal mode at Step S209 illustrated in FIG. 10. Furthermore, the control unit of the MFP that has accepted the execution-prohibition cancelling instruction resumes the execution of the process under suspension at Step S211 illustrated in FIG. 10.

The audio input apparatus 20 may be, for example, an operation panel mounted on the MFP 30. Here, the communication unit 25 of the audio input apparatus 20 and the communication unit 36 of the MFP 30 may be connected one another by the short range wireless communication in the peer-to-peer system (for example, Bluetooth™, Wi-Fi™ direct, and near-field communication (NFC)). Alternatively, interfaces included in both of the audio input apparatus 20 and the MFP 30 may be connected by wire to communicate with one another. The audio input apparatus 20 may have a structure configured to be removed from/mounted on the MFP 30. That is, the audio input apparatus 20 may be an input apparatus mounted on the MFP 30.

At Step S112 illustrated in FIG. 7, when the interference-process management unit 27d updates the small-sound-volume process table 26d, if there are the new "combination of the equipment ID, the process name, and the input sound volume" and the old "combination of the equipment ID, the process name, and the input sound volume" whose combinations of the equipment ID and the process name are common in the small-sound-volume process table 26d, and when the new input sound volume is less than the old input sound volume, the interference-process management unit 27d may overwrite the old "combination of the equipment ID, the process name, and the input sound volume" with the new "combination of the equipment ID, the process name, and the input sound volume." Repeat of this process can bring the input sound volume registered in the small-sound-volume process table 26d close to the input sound volume of the process alone corresponding to the process name transmitted from the MFP.

At Step S133 illustrated in FIG. 8, when the interference-process management unit 27d updates the noise-cause process table 26c, if there are the new "combination of the equipment ID, the process name, and the input sound volume" and the old "combination of the equipment ID, the process name, and the input sound volume" whose combinations of the equipment ID and the process name are common in the noise-cause process table 26c, and when the new input sound volume is less than the old input sound volume, the interference-process management unit 27d may overwrite the old "combination of the equipment ID, the process name, and the input sound volume" with the new "combination of the equipment ID, the process name, and the input sound volume." Repeat of this process can bring the input sound volume registered in the noise-cause process table 26c close to the input sound volume of the process alone corresponding to the process name transmitted from the MFP.

Between Steps S163 and S166 Illustrated in FIG. 12, the instruction transmitter 27c may transmit the process-name storing instruction for storing the process name of the process in execution, to all the MFPs shown in the target device information 26b. The control unit of the MFP that has accepted the process-name storing instruction stores the process name of the process in execution in the storage unit of the MFP itself at Step S203 illustrated in FIG. 10. After Step S171 illustrated in FIG. 12, the control unit 27 may execute the process of Steps S110 to S113 illustrated in FIG. 7 to terminate the operation Illustrated in FIGS. 7, 8, and 12.

The electronic device of the disclosure is the MFP in the embodiment. However, the electronic device of the disclosure may be an image forming apparatus except for the MFP, such as a printer-only machine, a FAX-only machine, a copy-only machine, and a scanner-only machine, or may be an electronic device except for the image forming apparatus, such as a Personal Computer (PC).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An audio input system comprising:
  an audio input apparatus including a microphone; and
  a plurality of electronic devices; wherein
  the audio input apparatus includes
    an audio input unit that receives audio via the microphone;
    a start instruction accepting unit that accepts a start instruction for an audio-input by the audio input unit, and
    an instruction transmitter that transmits an instruction to the plurality of electronic devices;
  the plurality of electronic devices includes
    a first electronic device that is a target of a process execution instruction based on the audio input by the audio input unit among the instructions, and
    one or more second electronic devices that are other than the target of the audio input instruction;
  the instruction transmitter transmits a process reducing instruction for reducing an execution of a process as the instruction to the plurality of electronic devices, when an input sound volume of the microphone exceeds a specific sound volume after the reception of the start instruction by the start instruction accepting unit;
  the audio input unit starts the audio input when the input sound volume of the microphone is equal to or less than the specific sound volume after the reception of the start instruction by the start instruction accepting unit;
  the instruction transmitter transmits the process execution instruction to the first electronic device; and
  the first electronic device accepts the process execution instruction transmitted from the instruction transmitter.

2. The audio input system according to claim 1, further comprising
  an interference-process managing unit that manages an interference process that interferes with the audio input; wherein
  the instruction transmitter transmits an execution prohibiting instruction for prohibiting an execution of the interference process managed by the interference-process managing unit as the process reducing instruction to the plurality of electronic devices, when the input sound volume of the microphone exceeds the specific sound volume after the reception of the start instruction by the start instruction accepting unit, and
  the interference-process managing unit manages a process that was executed by each of the plurality of electronic devices at a specific timing as the interference process, when the input sound volume of the microphone exceeds the specific sound volume until the specific timing after the transmission of the execution prohibiting instruction.

3. The audio input system according to claim 2, wherein:
  the instruction transmitter, after the audio input by the audio input unit terminates, transmits an execution-prohibition cancelling instruction that cancels the prohibition of the execution of the interference process as the instruction to the plurality of electronic devices; and
  the plurality of electronic devices, after accepting the execution prohibiting instruction, halt the execution of the interference process until when the plurality of electronic devices accept the execution-prohibition cancelling instruction.

4. The audio input system according to claim 2, wherein:
  the electronic device is configured to at least transfer to
    a normal mode, and
    a sound reduction mode where an execution of at least one process is reduced compared with the normal mode;
  the instruction transmitter transmits a sound-reduction-mode transferring instruction for transferring to the sound reduction mode as the process reducing instruction to the plurality of electronic devices;
  when the interference-process managing unit halts the management of the interference process while the input sound volume of the microphone exceeds the specific sound volume after the reception of the start instruction by the start instruction accepting unit; and when the input sound volume of the microphone exceeds the specific sound volume until the specific timing after the transmission of the execution prohibiting instruction.

5. The audio input system according to claim 2, wherein the interference-process managing unit manages the interference process by associating the interference process with the first electronic device.

6. The audio input system according to claim 2, wherein the interference-process managing unit manages a process that is executed by each of the plurality of electronic devices immediately after the reception of the start instruction by the start instruction accepting unit as a process other than the interference process, when the input sound volume of the microphone is equal to or less than the specific sound volume immediately after the reception of the start instruction by the start instruction accepting unit.

7. The audio input system according to claim 6, wherein the interference-process managing unit, when a process managed as the interference process overlaps a process managed as the process other than the interference process, manages the overlapping process as only the process other than the interference process.

8. The audio input system according to claim 6, wherein the interference-process managing unit manages the process other than the interference process by associating the process other than the interference process with the first electronic device.

9. The audio input system according to claim 2, wherein:
the interference-process managing unit manages the input sound volume of the microphone at a point when each of the plurality of electronic devices executed the interference process, associated with the interference process; and
the instruction transmitter, when the input sound volume of the microphone exceeds the specific sound volume after the reception of the start instruction by the start instruction accepting unit, transmits the execution prohibiting instruction in descending order of the input sound volume of the interference process associated by the interference-process managing unit to an electronic device corresponding to the interference process according to the order.

10. The audio input system according to claim 1, wherein the instruction transmitter transmits the process execution instruction to the first electronic device by a first wireless communication in a peer-to-peer system, and transmits the process reducing instruction to the first electronic device and the second electronic device by a second wireless communication via a network.

11. The audio input system according to claim 1, wherein the audio input apparatus is an input apparatus mounted on the first electronic device.

12. An audio input apparatus comprising:
a microphone;
an audio input unit that receives audio via the microphone;
a start instruction accepting unit that accepts a start instruction for an audio-input by the audio input unit; and
an instruction transmitter that transmits an instruction to a plurality of electronic devices; wherein
the instruction transmitter transmits a process reducing instruction for reducing an execution of a process as the instruction to the plurality of electronic devices, when an input sound volume of the microphone exceeds a specific sound volume after the reception of the start instruction by the start instruction accepting unit,
the audio input unit starts the audio input when the input sound volume of the microphone is equal to or less than the specific sound volume after the reception of the start instruction by the start instruction accepting unit, and
the instruction transmitter transmits a process execution instruction to the first electronic device that is a target of the process execution instruction as the instruction based on the audio input by the audio input unit among the plurality of electronic devices.

13. A non-transitory computer-readable recording medium storing an audio input program for controlling a computer including a microphone, the audio input program causing the computer to function as:
an audio input unit that receives audio via the microphone;
a start instruction accepting unit that accepts a start instruction for an audio-input by the audio input unit; and
an instruction transmitter that transmits an instruction to a plurality of electronic devices; wherein
the instruction transmitter transmits a process reducing instruction for reducing an execution of a process as the instruction to the plurality of electronic devices, when an input sound volume of the microphone exceeds a specific sound volume after the reception of the start instruction by the start instruction accepting unit,
the audio input unit starts the audio input when the input sound volume of the microphone is equal to or less than the specific sound volume after the reception of the start instruction by the start instruction accepting unit, and
the instruction transmitter transmits a process execution instruction to the first electronic device that is a target of the process execution instruction as the instruction based on the audio input by the audio input unit among the plurality of electronic devices.

* * * * *